US012242104B2

(12) United States Patent
Wigley et al.

(10) Patent No.: US 12,242,104 B2
(45) Date of Patent: Mar. 4, 2025

(54) MULTICORE OPTICAL FIBER CORE CONFIGURATION TRANSFORMER

(71) Applicant: CORNING RESEARCH & DEVELOPMENT CORPORATION, Corning, NY (US)

(72) Inventors: Peter Gerard Wigley, Corning, NY (US); Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 186 days.

(21) Appl. No.: 18/155,332

(22) Filed: Jan. 17, 2023

(65) Prior Publication Data

US 2024/0241306 A1 Jul. 18, 2024

(51) Int. Cl.
*G02B 6/02* (2006.01)
*G02B 6/24* (2006.01)
(Continued)

(52) U.S. Cl.
CPC ..... *G02B 6/02042* (2013.01); *G02B 6/02338* (2013.01); *G02B 6/24* (2013.01); *G02B 6/255* (2013.01); *G02B 6/26* (2013.01); *G02B 6/264* (2013.01); *G02B 6/3885* (2013.01); *G02B 6/02295* (2013.01); *G02B 6/12033* (2013.01); *G02B 6/2553* (2013.01);
(Continued)

(58) Field of Classification Search
CPC ............ G02B 6/02042; G02B 6/02295; G02B 6/02314; G02B 6/02338; G02B 6/0238; G02B 6/24; G02B 6/25; G02B 6/255; G02B 6/2553; G02B 6/2555; G02B 6/26; G02B 6/262; G02B 6/264; G02B 6/36; G02B 6/38; G02B 6/3885
See application file for complete search history.

(56) References Cited

U.S. PATENT DOCUMENTS 7,127,148 B2 10/2006 Mozolowski
8,712,199 B2 4/2014 Kopp et al.
(Continued)

FOREIGN PATENT DOCUMENTS

AU 2020100475 A4 4/2020
AU 2020100756 A4 6/2020
(Continued)

OTHER PUBLICATIONS

Machine translation into English of CN 113866870 A, 8 pages. (Year: 2021).*
(Continued)

*Primary Examiner* — Daniel Petkovsek
*Assistant Examiner* — Emma R. Oxford
(74) *Attorney, Agent, or Firm* — Adam R. Weeks

(57) ABSTRACT

Core configuration transformers and methods of making same. A core configuration transformer includes a transforming optical fiber having plurality of routing cores embedded therein. The transforming optical fiber includes a first end face and a second end face. The plurality of routing cores is configured to define a first end face core pattern at the first end face of the transforming optical fiber, and a second end face core pattern at the second end face of the transforming optical fiber that has one or both of a different arrangement of cores or a different polarity of cores.

10 Claims, 15 Drawing Sheets

(51) Int. Cl.
*G02B 6/255* (2006.01)
*G02B 6/26* (2006.01)
*G02B 6/38* (2006.01)
G02B 6/12 (2006.01)
G02B 6/35 (2006.01)

(52) U.S. Cl.
CPC ............ *G02B 6/3546* (2013.01); *G02B 6/356* (2013.01); *G02B 6/3594* (2013.01)

(56) References Cited

U.S. PATENT DOCUMENTS

| | | | |
|---|---|---|---|
| 9,069,116 | B2 | 6/2015 | Uemura et al. |
| 9,069,118 | B2 | 6/2015 | Matsuo et al. |
| 9,158,064 | B2 | 10/2015 | Saito et al. |
| 9,435,943 | B1 | 9/2016 | Takenaga et al. |
| 9,766,407 | B2 | 9/2017 | Weiner et al. |
| 9,810,845 | B2 | 11/2017 | Kopp |
| 9,851,510 | B2 | 12/2017 | Kopp |
| 9,885,825 | B2 | 2/2018 | Kopp |
| 9,946,014 | B2 | 4/2018 | Abedin et al. |
| 10,012,803 | B2 | 7/2018 | Watanabe et al. |
| 10,101,536 | B2 | 10/2018 | Kopp et al. |
| 10,126,494 | B2 | 11/2018 | Kopp |
| 10,281,654 | B2 | 5/2019 | Yue |
| 10,317,629 | B2 | 6/2019 | Nielson et al. |
| 10,473,860 | B1 | 11/2019 | Xia et al. |
| 10,564,360 | B2 | 2/2020 | Kopp et al. |
| 10,761,271 | B2 | 9/2020 | Kopp |
| 11,099,341 | B1 | 8/2021 | Bradley et al. |
| 2010/0195965 | A1 | 8/2010 | Sasaoka |
| 2011/0280517 | A1 | 11/2011 | Fini et al. |
| 2013/0163935 | A1 | 6/2013 | Sasaki |
| 2014/0010500 | A1 | 1/2014 | Saito et al. |
| 2016/0320556 | A1 | 11/2016 | Nasilowski et al. |
| 2019/0025501 | A1 | 1/2019 | Kopp |
| 2019/0033512 | A1 | 1/2019 | Uemura et al. |
| 2020/0064563 | A1 | 2/2020 | Kopp et al. |
| 2020/0124817 | A1 | 4/2020 | Ohmori et al. |
| 2021/0263217 | A1* | 8/2021 | Kopp .................. G02B 6/0288 |
| 2023/0266520 | A1* | 8/2023 | Oda .................... G02B 6/4482 385/126 |

FOREIGN PATENT DOCUMENTS

| | | | |
|---|---|---|---|
| CN | 202305881 | U | 7/2012 |
| CN | 102798931 | A | 11/2012 |
| CN | 204241728 | U | 4/2015 |
| CN | 103443679 | B | 11/2015 |
| CN | 106199834 | A | 12/2016 |
| CN | 104678496 | B | 10/2017 |
| CN | 105759358 | B | 10/2018 |
| CN | 105785511 | B | 11/2018 |
| CN | 109669235 | A | 4/2019 |
| CN | 109239845 | B | 7/2019 |
| CN | 110441862 | A | 11/2019 |
| CN | 110488417 | A | 11/2019 |
| CN | 111290075 | A | 6/2020 |
| CN | 113866870 | A * | 12/2021 |
| CN | 115963593 | A * | 4/2023 |
| FR | 2747801 | A1 | 10/1997 |
| GB | 2565128 | A | 2/2019 |
| JP | 62-047604 | A | 3/1987 |
| JP | 2001-154061 | A | 6/2001 |
| JP | 2012-022176 | A | 2/2012 |
| JP | 2013-134342 | A | 7/2013 |
| JP | 2013-174809 | A | 9/2013 |
| JP | 2014-112164 | A | 6/2014 |
| JP | 5547686 | B2 | 7/2014 |
| JP | 2016-061944 | A | 4/2016 |
| JP | 5911746 | B2 | 4/2016 |
| JP | 2016-139020 | A | 8/2016 |
| JP | 2019-113596 | A | 7/2019 |
| JP | 6655448 | B2 | 2/2020 |
| JP | 6696804 | B2 | 5/2020 |
| WO | 2013/172322 | A1 | 11/2013 |
| WO | 2015/020651 | A1 | 2/2015 |
| WO | 2018/099575 | A1 | 6/2018 |
| WO | 2018/135411 | A1 | 7/2018 |

OTHER PUBLICATIONS

Machine translation of CN 115963593 A, 12 pages. (Year: 2023).*
L. Colliard et al. "Direct-laser-writing of ultra-long waveguides in coreless optical fibers," in Optica Advanced Photonics Congress 2022, Technical Digest Series (Optica Publishing Group, 2022), paper BW2A.4, 2 pages. (Year: 2022).*
L. Colliard et al. "Ultrafast laser writing of arbitrary long low-loss waveguides in optical fibers," Opt. Lett. 47, 6253-6256, (2022), 4 pages. (Year: 2022).*
Extended European Search Report, EP application No. 23217677.6, Jun. 7, 2024, 7 pages, EP patent office.
D. Butler, et al., "Demonstration of Intra-Data Center Link Based on 1x4 Multicore Fiber (MCF) Edge-Coupled to Silicon Photonics ," ECOE 2021.
J. Grenier et al., "Femtosecond laser inscription of asymmetric directional couplers for in-fiber optical taps and fiber cladding photonics," Optics Express, vol. 23, 16760, 2015.
K. Li et al., "400G LR4 and 100G CWDM Transmission Over 1x4 Linear Array Multicore Fiber with 125-? m Cladding," OFC 2021 M3F.3, 2021, 3 Pages.
K. Shikama et al., "Multicore-Fiber Receptacle With Compact Fan-In/Fan-Out Device for SDM Transceiver Applications," J. Lightwave Tech. vol 36, 5815, 2018.
N. Psaila, "3D laser direct writing for advanced photonic integration," Proc. SPIE 10924, Optical Interconnects XIX, 109240U (Mar. 4, 2019).
Ryo Nagase, "Optical Connectivities for Multicore Fiber," OFC 2020 TH31.1.
T. Barwicz et al., "A novel approach to photonic packaging leveraging existing high-throughput microelectronic facilities," IEEE J. Sel. Topics Quantum Electron., vol. 22, pp. 8200712, 2016.
T. Matsui et al., "Design and Applicability of Multi-Core Fibers With Standard Cladding Diameter," J. Lightwave Tech, vol. 38, No. 21, pp. 60-65, 2020.
T. Matsui et al., "Design of 125 um cladding multi-core fiber with full-band compatibility to conventional single-mode fiber ," ECOE 2015 ID-217, 3 pages.
Tetsu Morishima et al., "MCF-enabled Ultra-High-Density 256-core MT Connector and 96-core Physical-Contact MPO Connector," OFC 2017, Th5D.4.
Tetsu Morishima, Ken Manabe, Shuhei Toyokawa, Tetsuya Nakanishi, Tomomi Sano, and Tetsuya Hayashi; "Simple-structure low-loss multi-core fiber LC connector using an align-by-contact method," Optics Express, vol. 29, 9157, 2021.
Y. Sasaki, et al., "Optical-Fiber Cable Employing 200-μm-Coated Four-Core Multicore Fibers," J. Lightwave Tech., vol. 40, pp. 1560-1560, 2022.
D. H. J. Son, "Fronthaul Size: Calculation of maximum distance between RRH and BBU," Apr. 2014. [Online]. Available: https://www.netmanias.com/en/post/blog/6276/c-ran-fronthaul-lte/fronthaul-size-calculation-of-maximum-distance-between-rrh-and-bbu.
R. Yongmin Jung, "Compact micro-optic based components for hollow core fibers," Opt. Express, No. 28, pp. 1518-1525, 2020. Available: https://opg.optica.org/oe/fulltext.cfm?uri-oe-28-2-1518 &id=425864.

* cited by examiner

MULTICORE OPTICAL FIBER CORE CONFIGURATION TRANSFORMER

TECHNICAL FIELD

This disclosure relates generally to fiber optic connectors and cable assemblies, and more particularly, to core configuration transformers that operatively couple multicore optical fibers having different core configurations.

BACKGROUND

Optical fibers are useful in a wide variety of applications, the most common being as part of the physical layer of a communication protocol through which network nodes communicate over a data network. Benefits of optical fibers include wide bandwidth and low noise operation. Continued growth of the Internet has resulted in a corresponding increase in demand for network capacity. This demand for network capacity has, in turn, generated a need for increased bandwidth between network nodes.

Multicore optical fibers are optical fibers in which multiple cores are contained within a common cladding. Multicore optical fibers function essentially as a bundle of single-core fibers, thereby providing increased capacity as compared to individual single-core optical fibers. Multicore optical fiber has been studied as one way to improve the transmission capacity of optical fibers in submarine and long haul applications. For short distance communications, the recent explosive growth of hyperscale data centers, edge computing, and 5G/6G access networks has been driving demand for new fiber installations with increasingly high fiber counts and cable density. Because the ability to increase fiber density by further reducing the diameter of single core optical fibers has reached a plateau, the deployment of multicore optical fiber is expected to increase to meet the growing demand for optical fiber density without expanding existing optical fiber ductwork.

To maintain compatibility with existing fiber optic ecosystems, multicore optical fiber designs typically use a cladding diameter that matches that of the existing single core optical fibers, e.g., about 125 μm. Multicore optical fibers are also typically designed to have similar optical properties as the single core optical fibers they replace. These optical properties include mode field diameter, attenuation per meter, wavelength range, bending performance, dispersion, etc. Maintaining similar physical dimensions and optical properties between multicore and single core optical fibers facilitates deploying multicore optical fibers as a simple drop-in replacement for existing single core optical fibers.

To meet the above design constraints, the cores of multicore optical fibers being deployed in fiber optic networks are often arranged in either a 2×2 or a 1×4 configuration within a 125 μm cladding. This allows the cores to have a similar mode field diameter (e.g., ~10 μm) as the single core fibers they interface with, while also maintaining acceptable loss specifications. All else being equal, a 2×2 configuration normally has lower losses per unit length than a 1×4 configuration. This performance advantage can be attributed to the closer core spacing required fit a one-dimensional array of cores within the same sized cladding as compared to a two-dimensional array of cores. Multicore optical fibers having cores arranged in a two-dimensional array are thus preferred over those having cores arranged in a one-dimensional array for longer runs and other situations where low loss is a priority.

However, multicore optical fibers having cores arranged in a one-dimensional array have their own advantages. For example, a 1×4 core configuration can facilitate higher density coupling between a multicore fiber optic cable and a transceiver chip than a 2×2 core configuration. Multicore optical fibers having cores arranged in a one-dimensional array are thus preferable for use in connecting to transceivers. As edge coupling becomes a more widely adopted fiber-to-chip connectivity technology, the "beach front" density of photonic integrated circuit chips may become the limiting factor on the bandwidth of the transceiver. The demand for high density edge coupled transceiver chips is therefore expected to increase the advantages of using multicore optical fiber interfaces having cores arranged in a one-dimensional array.

One way to address this core configuration dilemma would be to couple 2×2 multicore optical fibers used for transport to 1×4 multicore optical fibers that interface with transceivers with two fan-in/fan-out devices connected in series. However, this introduces other problems. FIGS. 1 and 2 depict an exemplary fan-in/fan-out device 10 that could be used to provide one half of the above described multicore optical coupling. The fan-in/fan-out device 10 includes a multicore optical fiber 12 and an optical coupler 18. The multicore optical fiber includes four cores 14 in a 2×2 configuration and a marker 16. The optical coupler 18 couples the multicore optical fiber 12 to four single core optical fibers 20. The optical coupler 18 includes a transparent body 22 (e.g., a block of silica glass) having a plurality of optical fan-in/fan-out waveguides 24 embedded within. Each optical fan-in/fan-out waveguide 24 operatively couples one core 14 of the multicore optical fiber 12 to the core 14 of a respective single core optical fiber 20.

The need to couple the multicore optical fiber 12 to four single core optical fibers 20 drives the minimum width of the optical coupler 18. This minimum width results in a lateral offset $d_1$ between the end positions of the waveguides 22 of about 375 μm for optical fibers having a cladding with a 125 μm diameter. This lateral offset $d_1$ sets the minimum length $d_2$ required for the waveguide to achieve a given bend loss. Although not depicted to scale by FIGS. 1 and 2, for waveguides 22 having a minimum radius of curvature of 50 mm, the optical coupler 18 of fan-in/fan-out device 10 alone would have a minimum length $d_2$ of about 10 mm. Adding two fan-in/fan-out devices connected in series through single core optical fibers at each transition between a transceiver port and a multicore optical fiber would thus add significant cost, take up significant space, and increase signal losses.

Accordingly, to address the conflicting requirements between transporting optical signals over distances and optimizing transceiver bandwidth, there is a need in the fiber optic industry for improved devices and methods for operatively coupling a multicore optical fiber having one core configuration to another multicore optical fiber having a different core configuration.

SUMMARY

In an aspect of the disclosure, a core configuration transformer is disclosed. The core configuration transformer includes a transforming optical fiber and a plurality of routing cores embedded in the transforming optical fiber. The transforming optical fiber includes a first end face and a second end face, and plurality of routing cores that are configured to define a first end face core pattern at the first end face of the transforming optical fiber and a second end face core pattern different from the first end face core pattern at the second end face of the transforming optical fiber.

In an embodiment of the disclosed core configuration transformer, the core configuration transformer may further include a first multicore optical fiber. The first multicore optical fiber includes a third end face and a plurality of first cores. The plurality of first cores is configured to define a third end face core pattern at the third end face that matches the first end face core pattern, and the third end face is operatively coupled to the first end face of the transforming optical fiber such that each core of the plurality of first cores is aligned with a respective routing core of the plurality of routing cores.

In another embodiment of the disclosed core configuration transformer, the core configuration transformer may further include a second multicore optical fiber. The second multicore optical fiber includes a fourth end face and a plurality of second cores. The plurality of second cores is configured to define a fourth end face core pattern at the fourth end face that matches the second end face core pattern, and the fourth end face is operatively coupled to the second end face of the transforming optical fiber such that each second core of the plurality of second cores is aligned with a respective routing core of the plurality of routing cores.

In another embodiment of the disclosed core configuration transformer, each of the first multicore optical fiber and the second multicore optical fiber may be operatively coupled to the transforming optical fiber by fusion splicing.

In another embodiment of the disclosed core configuration transformer, the core configuration transformer may further include a connector operatively coupled to the second end face of the transforming optical fiber.

In another embodiment of the disclosed core configuration transformer, the cores of one of the first end face core pattern and the second end face core pattern may be arranged in a one-dimensional array, and the cores of the other of the first end face core pattern and the second end face core pattern may be arranged in a two-dimensional array.

In another embodiment of the disclosed core configuration transformer, the one-dimensional array may have a 1×4 configuration, and the two-dimensional array may have a 2×2 configuration.

In another embodiment of the disclosed core configuration transformer, the locations of the plurality of routing cores in the first end face core pattern may be the same as the locations of the plurality of routing cores in the second end face core pattern, and a polarity of at least one core in the first end face core pattern may be different than the polarity of the at least one core in the second end face core pattern.

In another embodiment of the disclosed core configuration transformer, the locations of the plurality of routing cores in the first end face core pattern may be the same as the locations of the plurality of routing cores in the second end face core pattern, each of the first end face core pattern and the second end face core pattern may be arranged in a one-dimensional array, and the polarities of at least one inner core and one outer core in the first end face core pattern may be swapped as compared to the polarities of the at least one inner core and one outer core in the second end face core pattern.

In another embodiment of the disclosed core configuration transformer, each of the routing cores may be the same length.

In an aspect of the disclosure, a method of making the core configuration transformer is disclosed. The method includes splicing a first end of a length of coreless optical fiber to the first end face of the first multicore optical fiber, and splicing a second end of the length of coreless optical fiber to the second end face of the second multicore optical fiber. The first multicore optical fiber includes the first plurality of cores that define the first end face core pattern at the first end face. The second end face of the second multicore optical fiber includes the second plurality of cores that define the second end face core pattern at the second end face different from the first end face core pattern. The method further includes defining the transforming optical fiber by writing the plurality of routing cores in the length of coreless optical fiber, wherein each routing core is configured to operatively couple a respective core of the first plurality of cores to a respective core of the second plurality of cores.

In an embodiment of the disclosed method, the method may further include cleaving at least a portion of one of the first multicore optical fiber or the second multicore optical fiber to expose a third end face, and operatively coupling the third end face to the first connector.

In another embodiment of the disclosed method, the first connector may include a ferrule, and operatively coupling the third end face may include placing the transforming optical fiber into the ferrule of the first connector.

In another embodiment of the disclosed method, the other of the first multicore optical fiber or the second multicore optical fiber may include the fourth end face, and the method may further include operatively coupling the fourth end face to the second connector.

In another embodiment of the disclosed method, writing each routing core may include positioning a focal point of a laser beam within the length of coreless optical fiber proximate to a selected core of the first plurality of cores. Writing may further include causing the laser beam to provide energy sufficient to induce a change in a refractive index of the length of coreless optical fiber in a region of the focal point, and moving at least one of the focal point or the length of coreless optical fiber so that the focal point is moved along a predetermined path within the length of coreless optical fiber. The predetermined path may connect the selected core of the first plurality of cores to a selected core of the second plurality of cores. Writing each routing core may further include continuing to cause or repeatedly causing the laser beam to provide the energy, and moving the focal point along the predetermined path, until the routing core operatively couples the selected core of the first plurality of cores to the selected core of the second plurality of cores.

In another embodiment of the disclosed method, the splicing of the length of coreless optical fiber to the first and second multicore optical fibers may be performed by fusion splicing.

In another embodiment of the disclosed method, the cores of one of the first and second end face core patterns may be arranged in a one-dimensional array, and the cores of the other of the first and second end face core patterns may be arranged in a two-dimensional array.

In another embodiment of the disclosed method, the locations of the plurality of routing cores in the first end face core pattern may be the same as the locations of the plurality of routing cores in the second end face core pattern, and the polarity of at least one core in the first end face core pattern may be different than the polarity of the at least one core in the second end face core pattern.

In another embodiment of the disclosed method, each of the first end face core pattern and the second end face core pattern may be arranged in a one-dimensional array, and the polarities of at least one inner core and one outer core in the first end face core pattern may be swapped as compared to the polarities of the one inner core and the one outer core in the second end face core pattern.

In another embodiment of the disclosed method, each of the routing cores may be the same length.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
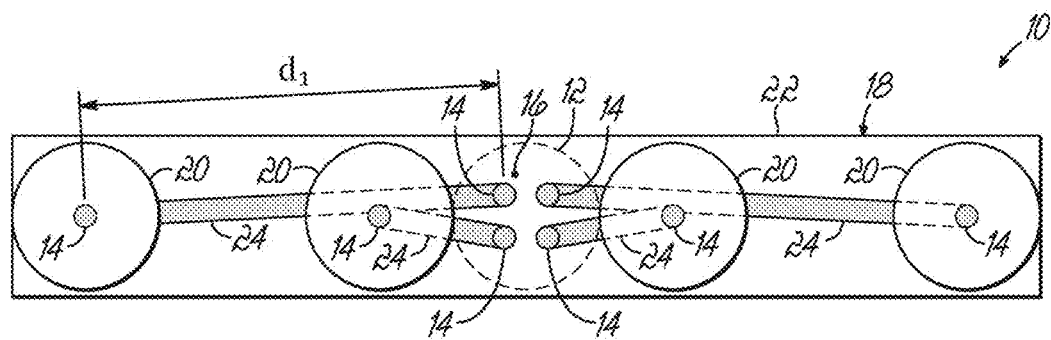
FIG. 1 is a diagrammatic end view of an exemplary fan-in/fan-out device that may be used to couple a multicore optical fiber to a plurality of single core fibers.

Various embodiments will be further clarified by the examples described below. In general, the below description relates to optical fibers, fiber optic cabling systems, cable assemblies, and other fiber optic network components including one or more fiber optic connectors, which may also be referred to as "optical connector", or simply "connector". An optical fiber includes one or more higher refractive index regions referred to as "cores". The one or more cores are surrounded by a lower refractive index region referred to as "cladding". Each core and the adjacent cladding define an optical waveguide which guides light along the length thereof. The cores within a multicore optical fiber are substantially parallel to each other such that an end face of the multicore optical fiber will have the same end face core pattern regardless of where the fiber is cleaved along its length. Two end face core patterns are considered to be the same if both the location and the polarity of each core of each core pattern are the same. If either one of or both the position and the polarity of one or more cores in the end face core patterns do not match, the end face core patterns are considered to be different.

Connectors that include one or more multicore optical fibers may have the fibers configured in an arrangement that provides a connector core pattern at the connector interface. The connector core pattern is the pattern of the cores in the multicore optical fiber arrangement at the connector interface. Thus, the connector core pattern is defined by both the end face core patterns and the placement of the end faces of the multicore optical fibers in the connector interface. Placement of the end faces refers to selecting both the position and orientation of each end face in the connector interface such that the core pattern of each end face provides a portion of the desired connector core pattern.

Exemplary devices disclosed herein are compact, have low losses, and operatively couple multicore optical fibers having a two-dimensional array of cores (e.g., four cores in a 2×2 configuration) to multicore optical fibers having a one-dimensional array of cores (e.g., four cores in a 1×4 configuration). Exemplary devices may also be configured to operatively couple multicore optical fibers having the same core locations (e.g., four cores in a 2×2 configuration or four cores in a 1×4 configuration), but with different core polarities. Exemplary embodiments include a patch cord having one end terminated in a connector having one or more 2×2 multicore optical fibers and the other end terminated in a connector having one or more 1×4 multicore optical fibers. Additional exemplary embodiments include a patch cord having both ends terminated in connectors having one or more 2×2 multicore optical fibers or one or more 1×4 multicore optical fibers, but with different core polarities at each end thereof. In each of the exemplary embodiments, the transforming regions of the patch cord may be less than 1 mm long, and can thus be packaged inside the ferrules of one of the connectors. Although the exemplary embodiments described below focus on multicore optical fibers having cores in 1×4 and 2×2 configurations for purposes of clarity and brevity, the invention is not so limited. Thus, it should be understood that multicore optical fibers having different numbers of cores in different configurations can also be used.

In this disclosure, various elements are described as being "operatively coupled". The term "operatively coupled" refers to the elements being arranged relative to each other for achieving a particular functional relationship, the latter being clear from context. For example, end faces of two optical fibers are "operatively coupled" when the end faces confront each other with the objective to pass optical signals from one end face to another. As another example, a connector is considered to be operatively coupled to an optical fiber when the connector is installed onto the optical fiber so that the connector may be used to help the optical fiber establish optical connections (e.g., with another optical fiber in another connector or device).

Figure 3:
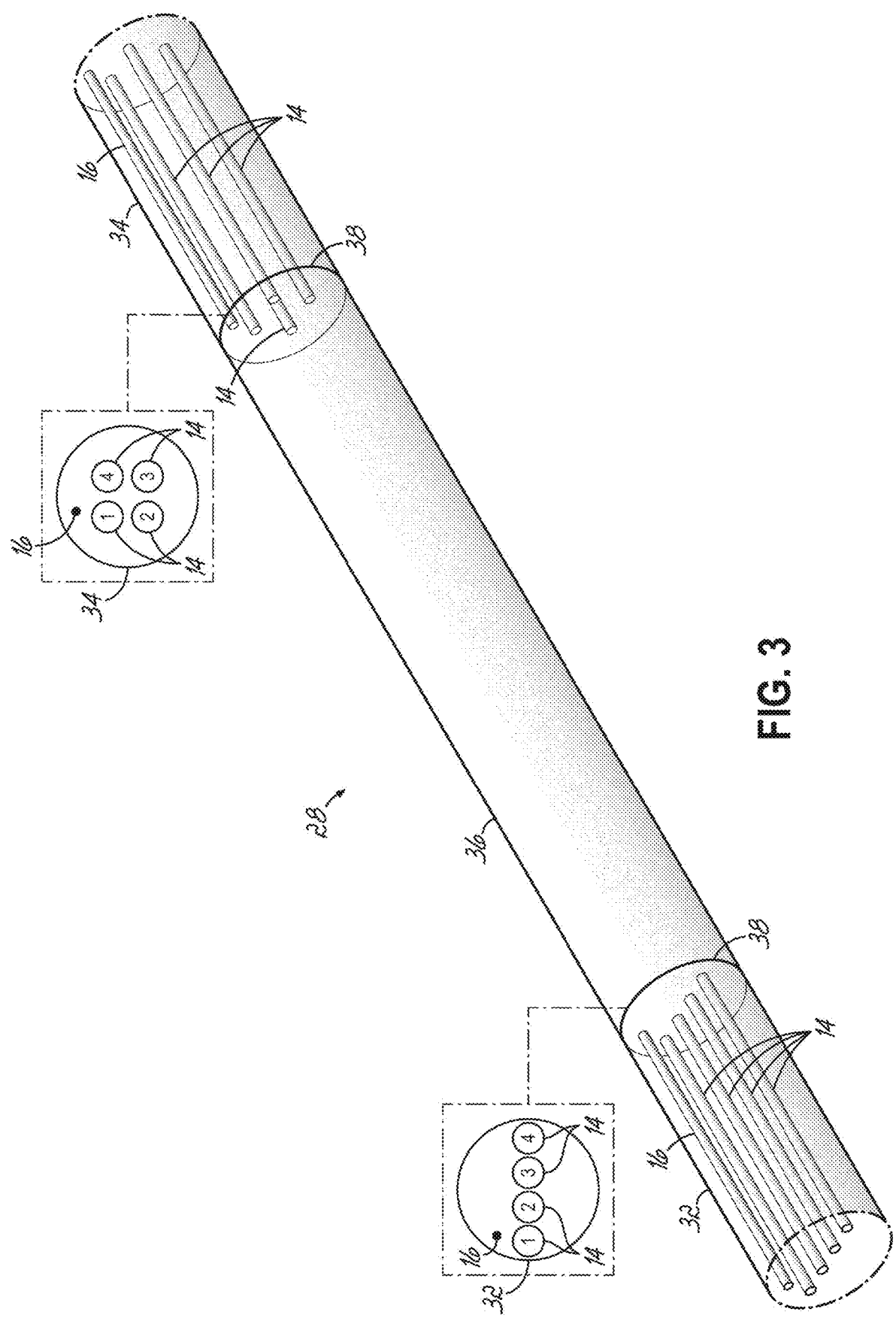
FIG. 3 is a diagrammatic perspective view an exemplary core configuration transformer including a coreless transforming optical fiber.
Figure 4:
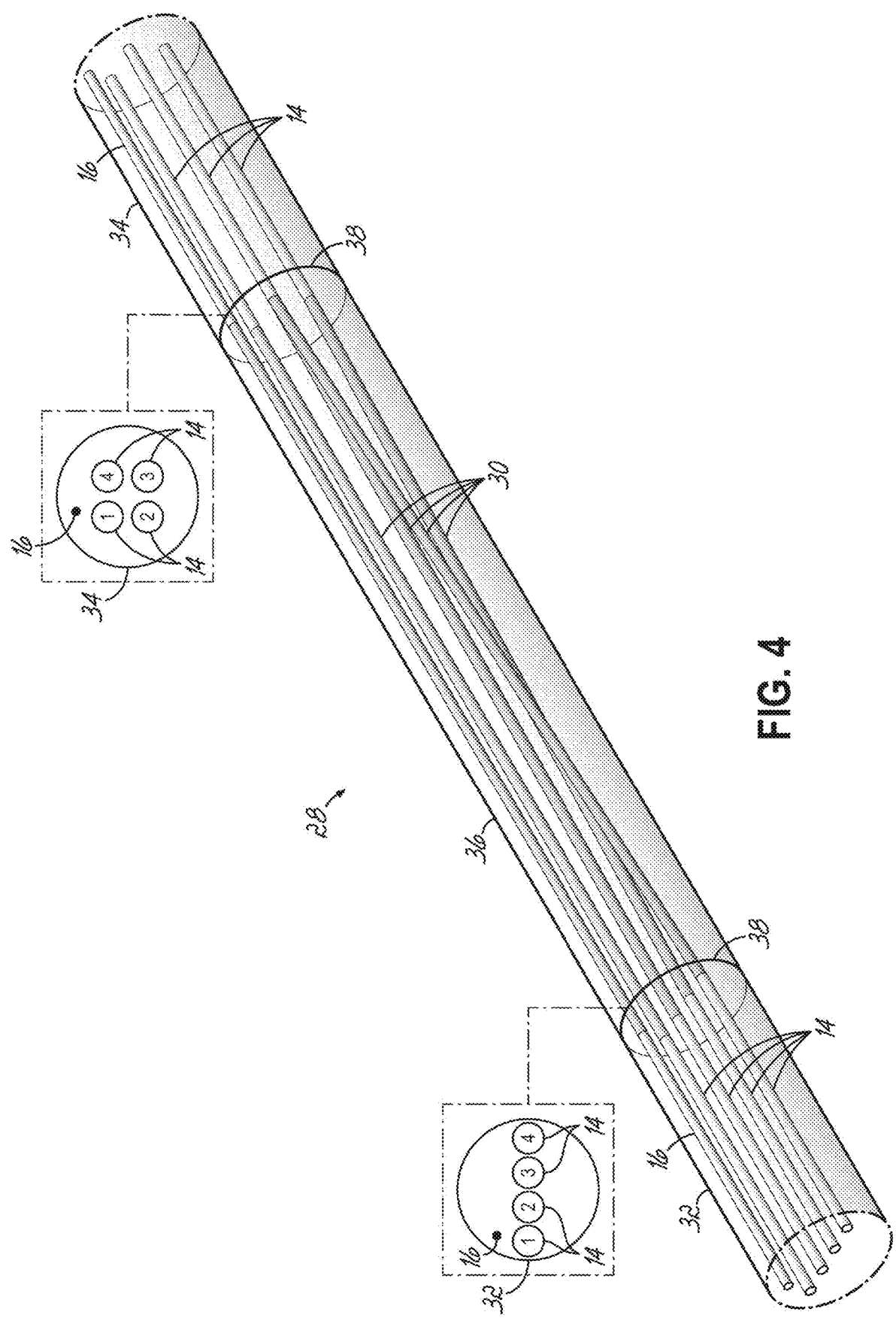
FIG. 4 is a diagrammatic perspective view of the core configuration transformer of FIG. 3 after a plurality of routing cores have been formed in the transforming optical fiber.

FIG. 3 depicts an exemplary core configuration transformer 28 prior to formation of routing cores 30, and FIG. 4 depicts the core configuration transformer 28 after formation of the routing cores 30. As depicted by FIG. 3, the core configuration transformer 28 includes a length of multicore optical fiber 32 having cores 14 arranged in a one-dimensional array (e.g., a 1×4 multicore optical fiber), a length of multicore optical fiber 34 having cores 14 arranged in a two-dimensional array (e.g., a 2×2 multicore optical fiber), and a length of coreless optical fiber (i.e., a coreless cladding) referred to herein as a transforming optical fiber 36.

The transforming optical fiber 36 may comprise any suitable material, such as fused silica, borosilicate, sulfide, or lead glass, and may also contain a dopant. Each end face 38 of the transforming optical fiber 36 is joined to an end face 38 of a respective multicore optical fiber 32, 34 using a suitable process, such as fusion splicing. The end face 38 of each the multicore optical fiber 32, 34 has a core pattern and a core polarity defined by the core configuration thereof. Accordingly, the end faces 38 of the depicted multicore optical fibers include a 1×4 core pattern (multicore optical fiber 32) and a 2×2 core pattern (multicore optical fiber 34).

For purposes of illustration only, and to facilitate identification by the reader, each core 14 is depicted with a number (e.g., "1", "2", "3" or "4"). The marker 16 indicates the location of reference routing core 30, which is labeled with number "1". The marker 16 defines an asymmetry in the core pattern of each multicore optical fiber 32, 34. This asymmetry allows the identity of each core 14 of the multicore optical fibers 32, 34 to be determined based on the position of the core 14 relative to a reference core 14, e.g., the core nearest the marker 16. For example, once the reference core 14 is identified, the remaining cores 14 may be identified based on a predetermined naming convention for the cores 14. Although the core pattern asymmetry is depicted in this and the following examples as being provided by the marker 16, it should be understood that a core pattern asymmetry can also be provided by arranging the cores in an asymmetric pattern within each individual multicore optical fiber, e.g., by using an off position reference core.

During the splicing process, clocking orientations of the multicore optical fibers 32, 34 may be aligned to within a predetermined angular tolerance θ, e.g., within two degrees. After the multicore optical fibers 32, 34 have been joined to the transforming optical fiber 36, the routing cores 30 may be formed in the transforming optical fiber 36 using a known process, such as femtosecond laser writing. Femtosecond laser writing refers to a process in which a pulsed laser beam is focused at a position within the transforming optical fiber 36. The focal point of the pulsed laser beam provides sufficient energy to induce an increase in the refractive index of the transforming optical fiber 36 in the region of the focal point. By moving the focal point and transforming optical fiber 36 relative to one another, and selectively activating the laser, a routing core 30 can be formed within the transforming optical fiber 36 along a predetermined path.

Figure 5:
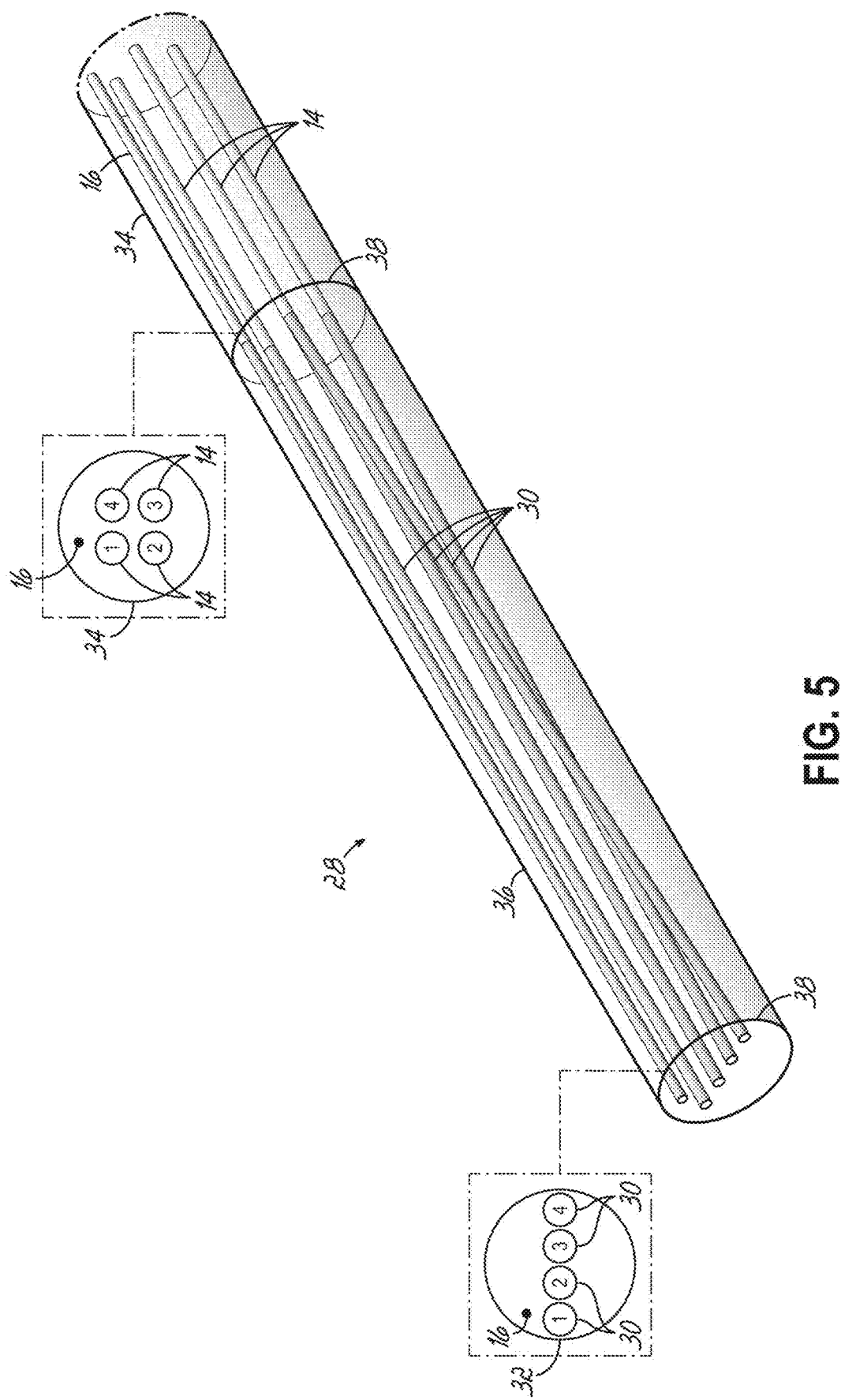
FIG. 5 is a diagrammatic perspective view of the core configuration transformer of FIG. 4 after cleaving to expose an end face thereof.

FIG. 5 depicts the core configuration transformer 28 after it has been cleaved in preparation for insertion into a connector. As shown, cleaving may completely remove the multicore optical fiber 32, thereby exposing an end face 38 of transforming optical fiber 36 to which the connector can be operatively coupled. However, is should be understood that in an alternative embodiment, at least a portion of the length of multicore optical fiber 32 may be left in place for coupling to the connector. In any case, by virtue of the routing core formation process, the end face core pattern of the transforming optical fiber 36 matches that of the multicore optical fiber at the location of the cleave.

Figure 6:
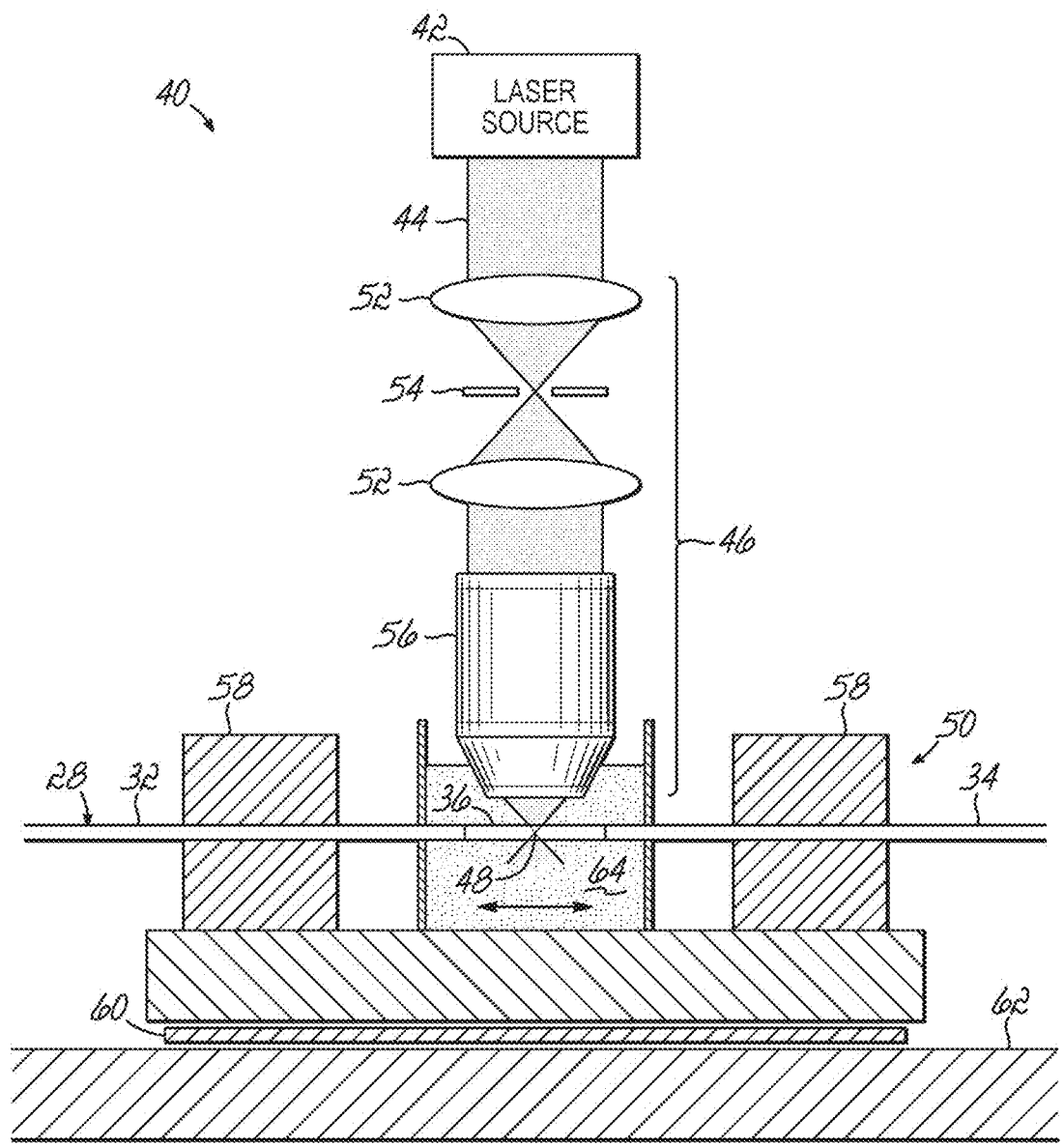
FIG. 6 is a schematic view a laser writing system that may be used to form the routing cores in the transforming optical fiber of FIGS. 4 and 5.
Figure 7:
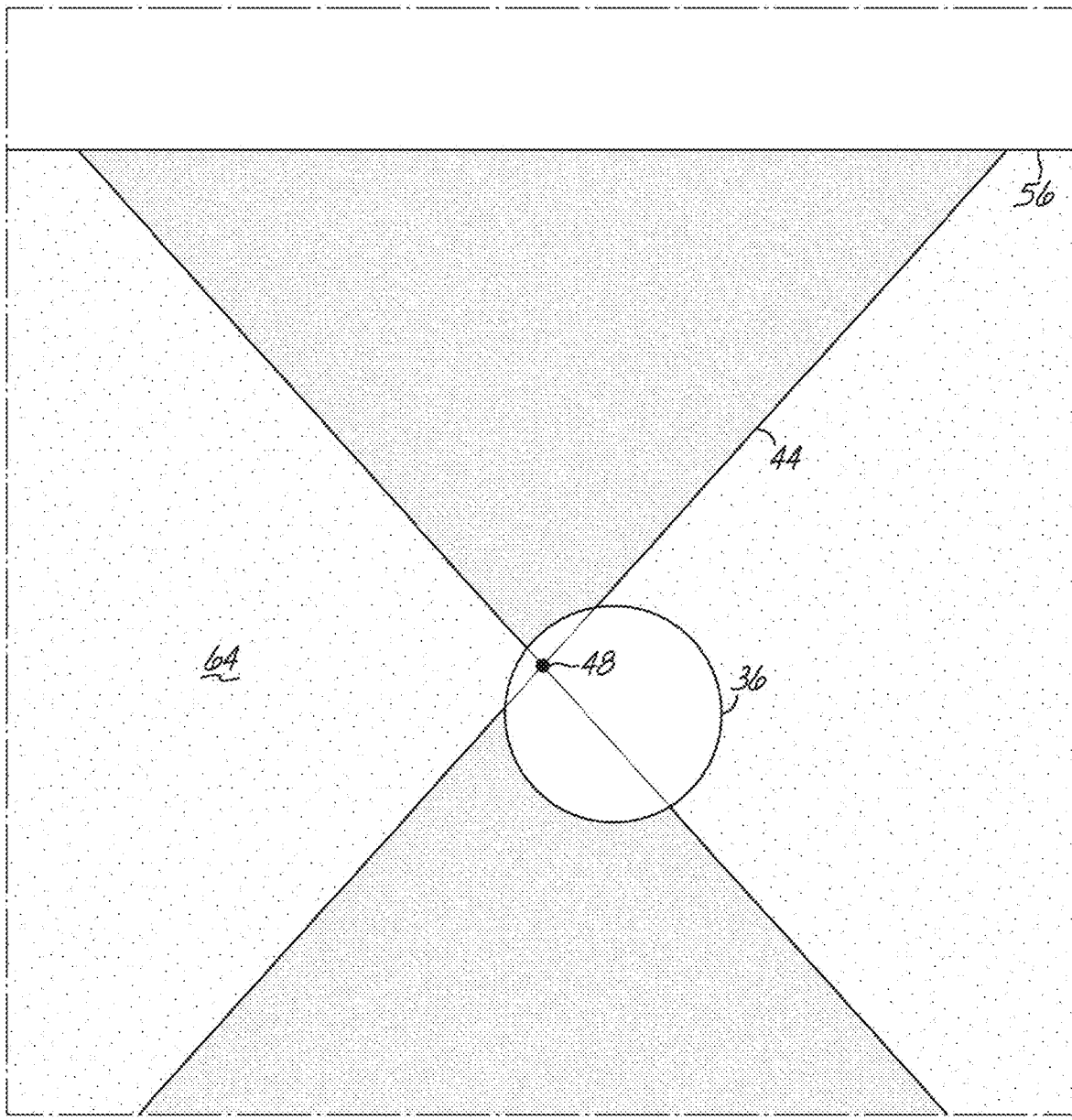
FIG. 7 is a diagrammatic cross-sectional view showing a focal point generated by the laser writing system of FIG. 6 in the transforming optical fiber.

FIG. 6 depicts an exemplary femtosecond laser writing system 40 that includes a laser source 42 configured to selectively emit a laser beam 44 (e.g., under the control of a computer), an optical assembly 46 that brings the laser to a focal point 48, and a worktable 50. FIG. 7 depicts an enlarged cross-sectional view of the focal point 48 located within the transforming optical fiber 36. The optical assembly 46 may include one or more lenses 52 and an aperture 54 configured to operatively couple at least a portion of the laser beam 44 into a microscope objective 56. The microscope objective 56 focuses the laser beam 44 to generate the focal point 48.

The worktable 50 may be include clamps 58 configured to hold the core configuration transformer 28, and may be supported by a bearing 60 that enables the worktable 50 to be moved relative to a support surface 62. Movement may be controlled, for example, by computer activation of various actuators (not shown) configured to move the worktable 50 relative to the focal point 48.

During the writing process, the core configuration transformer 28 is placed under the microscope objective 56. The space between the microscope objective 56 and the transforming optical fiber 36 may be filled with optical medium 64 (e.g., oil) having an index of refraction matched to that of the transforming optical fiber 36. The index matching optical medium 64 may serve to reduce or eliminate a refractive effect of the transforming optical fiber 36 from affecting the position or shape of the focal point 48. The optical medium 64 may thereby facilitate a laser writing process similar to those used for writing on flat glass substrates.

The focal point 48 may be placed within the transforming optical fiber 36 at a select focus depth (which may be defined by a z-coordinate) and location (which may be defined by x and y-coordinates) by moving one or both of the laser beam 44 and worktable 50. The start and end positions of each routing core 30 may be calibrated by positioning the focal point 48 on the respective multicore optical fiber cores 14 being coupled at one or both interfaces between the multicore optical fibers 32, 34 and the transforming optical fiber 36. In cases where the position of the coreless optical fiber can be determined with sufficient precision, the position of the focal point 48 may not need to be calibrated based on the position of the cores of the multicore optical fibers 32, 34. A marker 16 may also be written into the transforming optical fiber 36 to facilitate identification of the routing cores 30 in cases where one or both of the multicore optical fibers 32, 34 are cleaved away from the transforming optical fiber 26 after formation of the routing cores 30.

To define a routing core 30 in the transforming optical fiber 36, the laser beam 44 may be operated (e.g., pulsed) while the focal point 48 is located at a point along a predetermined path. After sufficient energy has been delivered to the region of the transforming optical fiber 36 where the focal point 48 is positioned to change the refractive index of the cladding material, the focal point 48 may be moved to another (e.g., an adjacent) region along the predetermined path. The routing cores 30 may thereby be defined in the transforming optical fiber 36 by moving the focal point 48 along the predetermined path connecting a selected core 14 in each of the multicore optical fibers 32, 34, and selectively activating the laser beam 44. The size, shape, and position of the routing core 30 relative to the outer surface and the end faces of the transforming optical fiber 36 may be controlled by adjusting the power, size, and position of the focal point 48.

Figure 2:
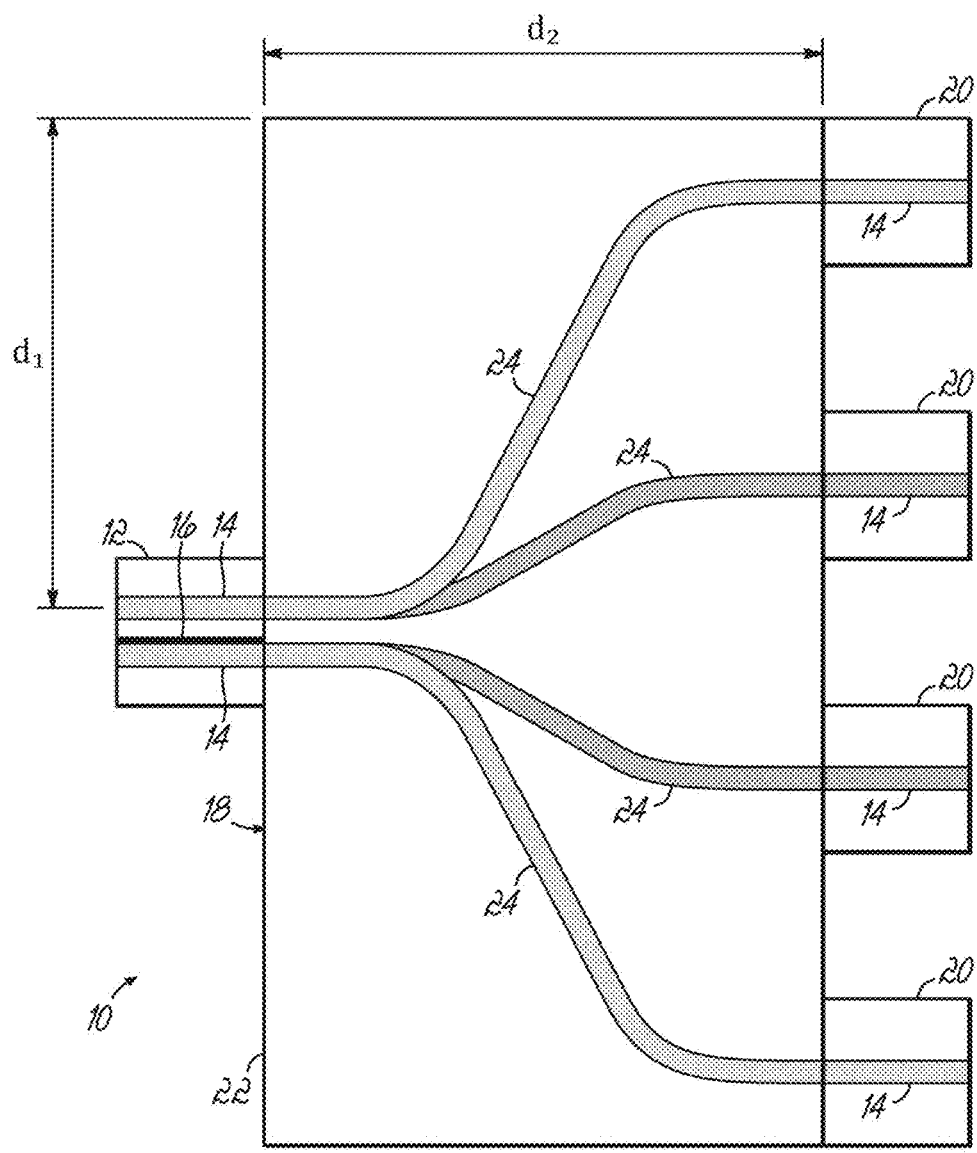
FIG. 2 is a diagrammatic top view of the exemplary fan-in/fan-out device of FIG. 1.

Fabrication of fan-in/fan-out devices 10 such as depicted in FIGS. 1 and 2 may also use an ultrafast laser writing processes. However, the optical couplers 18 of these devices are prefabricated by etching the fan-in/fan-out waveguides 24 into a glass substrate. The multicore optical fiber 12 and single core optical fibers 20 must then be actively aligned with the fan-in/fan-out waveguides 24 of each optical coupler 18. This alignment is a time consuming process that sometimes fails to produce a perfect alignment between the waveguides 24 and the cores 14. In contrast, forming the routing cores 30 in the transforming optical fiber 36 after splicing to the multicore optical fibers 32, 34 enables each routing core 30 to be precisely routed to the positions of the cores 14 during the writing process. This saves time and produces a device with lower insertion loss due to the precision of the alignment between the cores 14 of the multicore optical fibers 32, 34 and the routing cores 30.

Figure 8:
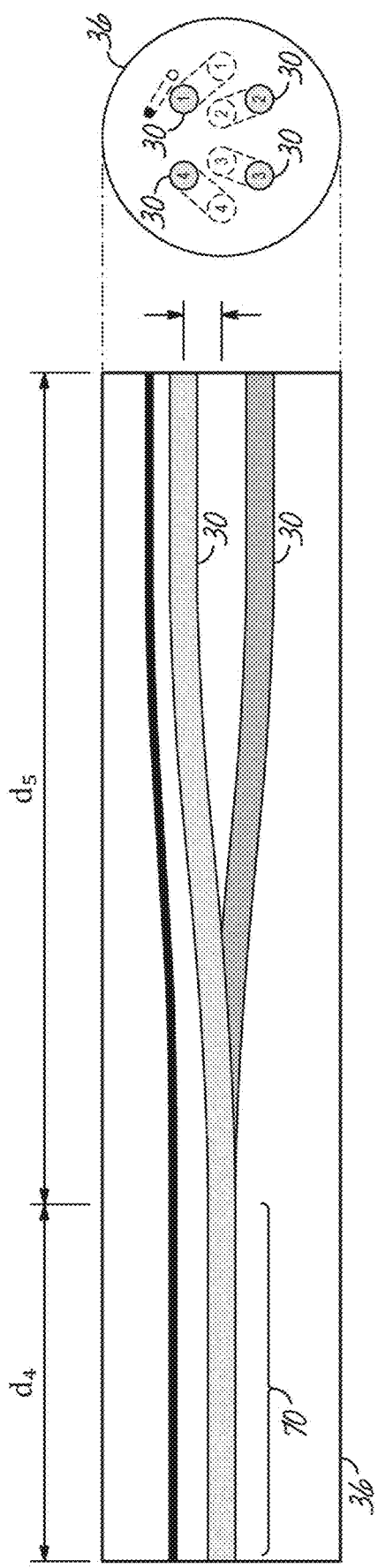
FIG. 8 is a diagrammatic view from the side and end of a portion of the exemplary core configuration transformer of FIG. 5 depicting the paths of the routing cores.
Figure 9:
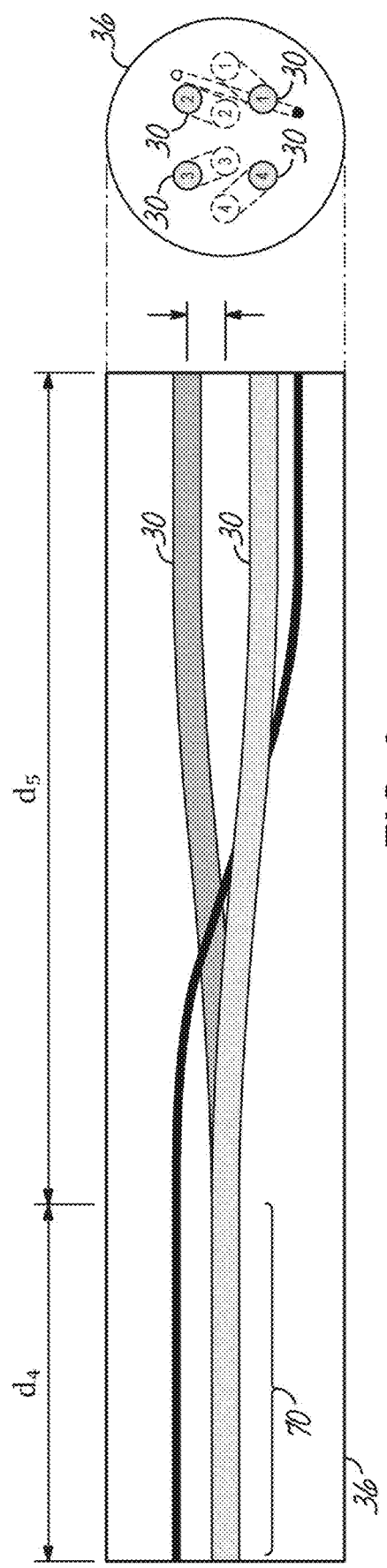
FIG. 9 is a diagrammatic view from the side and end of an alternative embodiment of the portion of core configuration transformer of FIG. 8 with routing cores having different paths.

Another advantage over fan-in/fan-out devices 10 is that the routing cores 30 can be much shorter than the fan-in/fan-out waveguides 24. FIGS. 8 and 9 depict exemplary transforming optical fibers 36 illustrating exemplary paths of routing cores 30 for two routing schemes that convert between a 1×4 core configuration and a 2×2 core configuration. Each routing core 30 may have a straight section 70 with a sufficient length $d_4$ (e.g., 0.3 mm) to allow part of the routing cores 30 to be removed during a connector termination process. The pre-fusion one-dimensional multicore optical fiber 32 may be a sacrificial component that can be cleaved off after the routing core 30 fabrication process. By way of example, if the routing core 30 must maintain a minimum bend radius of 50 mm in order to prevent excessive insertion loss, the minimum transition length $d_5$ may be 0.7 mm assuming a raised cosine profile. If the total length of the transforming optical fiber 36 is 1 mm, up to 0.3 mm of the straight waveguides can be allocated for fiber termination. Considering that the propagation loss of laser written optical waveguides in is the range of 0.1~0.2 dB/cm, the loss in the routing cores 30 should be less than 0.02 dB. The short routing core length also enables the transforming optical fiber 36 to be placed inside a connector ferrule. The termination process for the transforming optical fiber with waveguides can then be same as the process used for multicore optical fiber.

In each case, and presuming a 40 μm core pitch for the 2×2 multicore optical fiber and a 26 μm core pitch for the 1×4 multicore optical fiber, the maximum lateral offset between the ends of the routing cores is $d_3$=27.6 μm. Because the minimum length of both the optical coupler 18 and core configuration transformer 28 are dependent on their respective lateral offsets, the length of the multicore optical fiber transforming waveguide can be 13.6 times shorter than that of the optical coupler 18 of fan-in/fan-out device 10.

Either of the exemplary routing schemes illustrated in FIGS. 8 and 9 may be optimal in certain use cases, however embodiments are not limited to the routing schemes depicted. It should be understood that alternative routing schemes can be implemented to provide any core polarity desired by modifying the routing of the cores 30 during the writing process. Alternate sections of multicore optical fiber can therefore be used to provide symmetric, asymmetric, transpose, or shuffle operations. Optical performance of individual cores may also be balanced within a multicore optical fiber by alternating the occupancy of a fiber core between those closest to and farthest from the fiber center.

Figure 10:
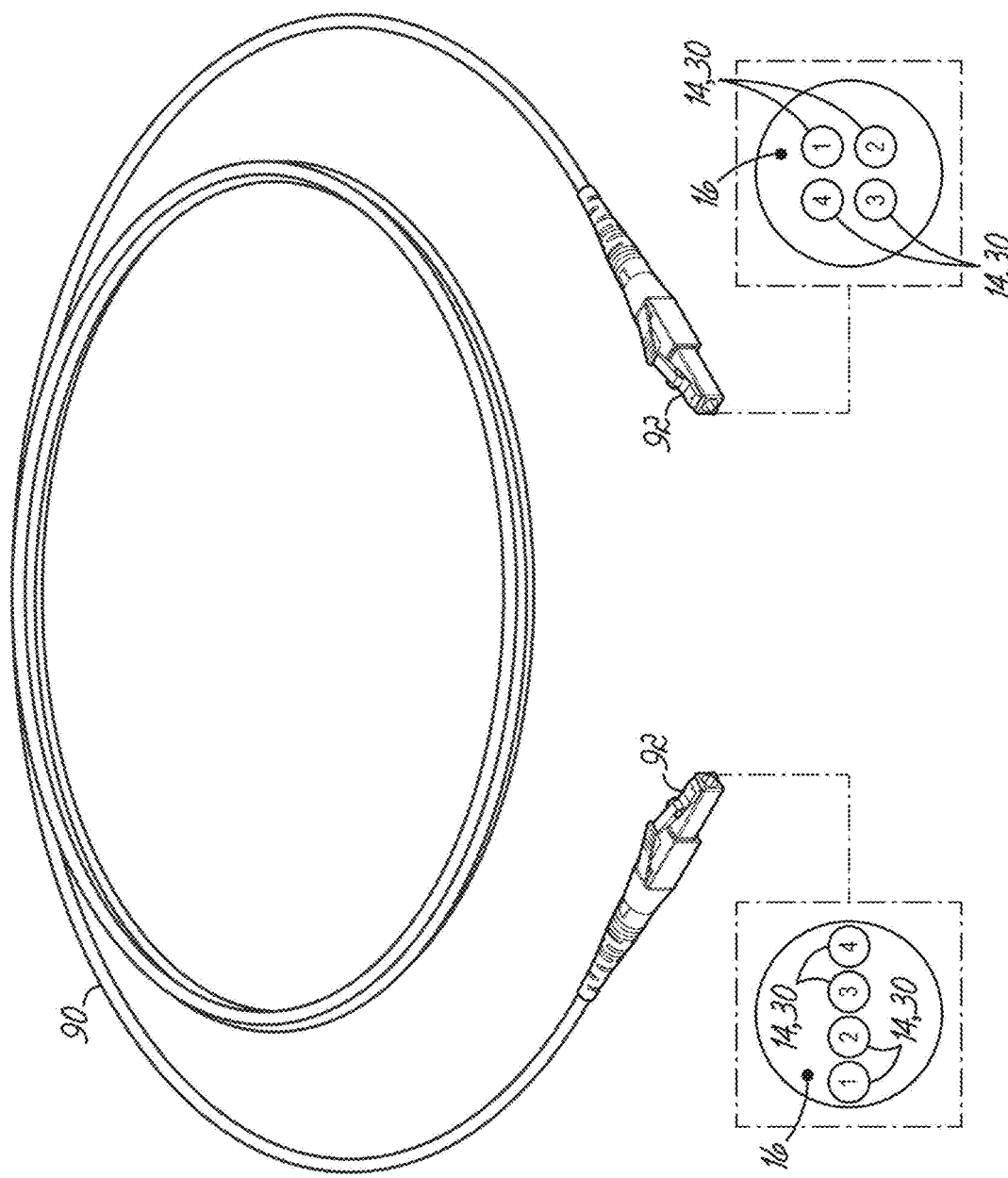
FIG. 10 is a diagrammatic view of an exemplary connectorized patch cable including the core configuration transformer of FIG. 5.

FIG. 10 depicts an exemplary connectorized patch cable 90 terminated with connectors 92, e.g., SC or LC connectors. Each connector 92 includes a ferrule (e.g., a ceramic ferrule—not shown) into which an end of the core configuration transformer 28 is inserted. Because two-dimensional core configurations tend to have lower loss and cross-talk, it may be preferable to embed the transforming optical fiber 36 in the connector at the one-dimensional end of the patch cable 90. However, alternative embodiments may place the transforming optical fiber 36 in the connector at the two-dimensional end of the patch cable 90, or somewhere along the patch cable 90 (e.g., mid-way) between the connectors 92.

Figure 11:
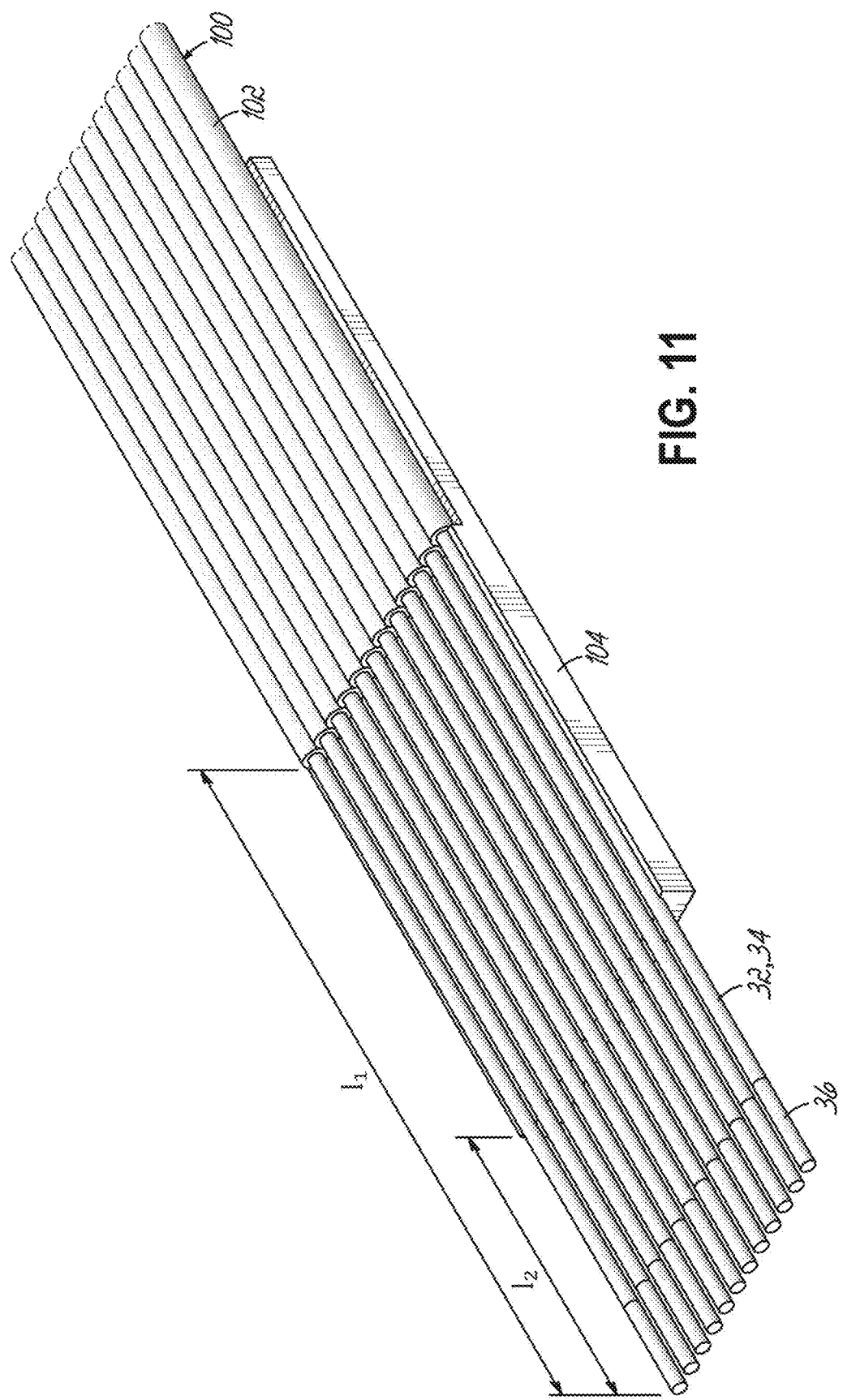
FIG. 11 is a diagrammatic perspective view of an array of multicore optical fibers each including a transforming optical fiber on the end thereof.
Figure 12:
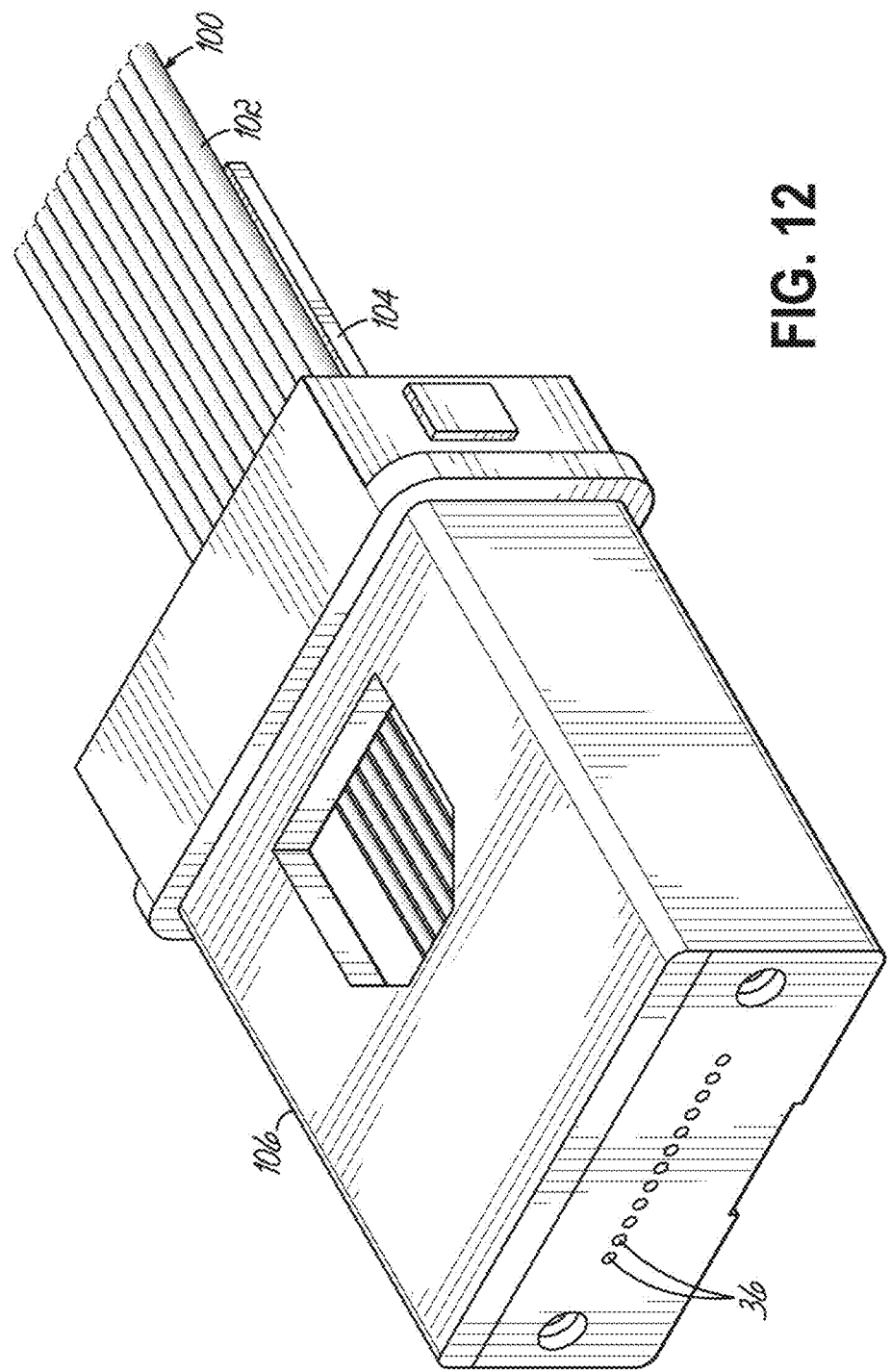
FIG. 12 is a diagrammatic perspective view of the array of multicore optical fibers of FIG. 11 after being operatively coupled to a connector ferrule.

FIG. 11 depicts an array of multicore optical fibers 32, 34 each including a transforming optical fiber 36 at the end thereof. Each of the multicore optical fibers 32, 34 may be part of a fiber optic cable 100 and include an outer sheath 102. Each outer sheath 102 has been stripped away from a length $l_1$ of its respective multicore optical fiber 32, 34 to provide an overhang length $l_2$ when the multicore optical fiber 32, 34 is pre-aligned on a substrate 104. As depicted by FIG. 12, the overhang length $l_2$ may be selected to accommodate insertion into a ferrule 106, e.g., an MTP ferrule. Each multicore optical fiber 32, 34 may be rotationally aligned within the ferrule 106 so that the locations of the cores are within an angular accuracy of <0.2 degrees. The substrate 104 may include V-grooves (not shown) that support the multicore optical fibers 32, 34 for insertion in and bonding to the ferrule 106.

Figure 13:
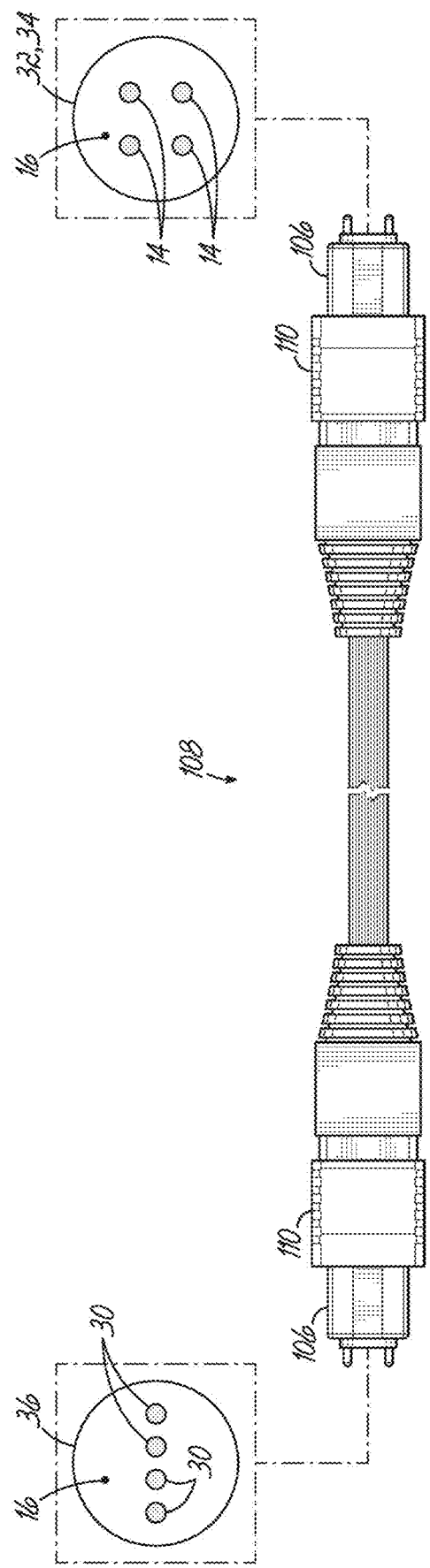
FIG. 13 is a diagrammatic view of a finished fiber optic cable terminated at each end by a connector including the ferrule of FIG. 12.

FIG. 13 depicts a finished cable 108 with the ferrules 106 inserted into respective connector housings 110. The relatively short length of the transforming optical fiber 36 (e.g., 1 mm) allows it to be fully inserted into ferrules having a longer micro hole length, such as an MTP/MPO connector, which typically has ferrules with micro holes that are 3 mm long. In an alternative embodiment, rather than connectorizing the core configuration transformer 28, the 1×12 array of transforming optical fibers 36 depicted by FIG. 10 may be directly interfaced to one or more transceiver chips using integrated alignment v-grooves. In yet another alternative embodiment, the array of transforming optical fibers 36 may be integrated into a fiber array unit that supports a conventional fiber to chip coupling process.

Figure 14:
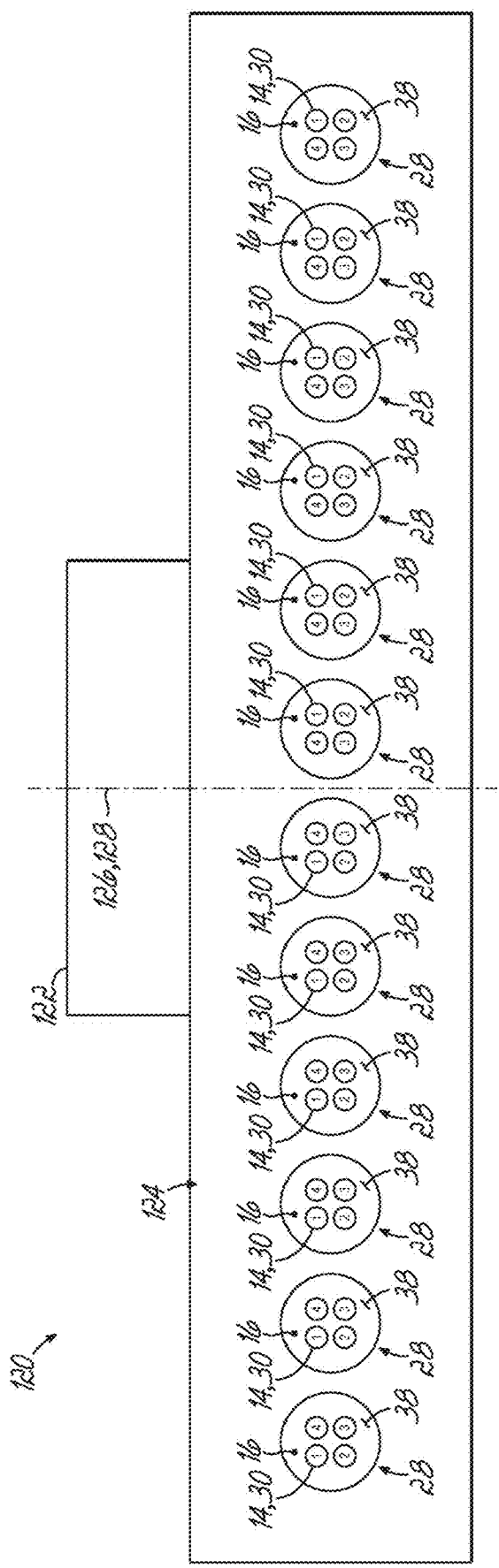
FIG. 14 is a schematic end view of an exemplary connector that may be operatively coupled to one end of multicore fiber optic cable including a plurality of core configuration transformers.

FIG. 14 depicts an exemplary connector 120 that may be operatively coupled to one end of a multicore fiber optic cable including a plurality of (e.g., 12) core configuration transformers 28. Each core configuration transformer 28 may include an end face 38 having a plurality of cores 14 or routing cores 30, as the case may be depending on where the core configuration transformers 28 are cleaved for termination by the connector 120. The depicted cable connector 120 includes an alignment key 122, and the end faces 38 of the core configuration transformers 28 are arranged within the connector 120 to define a connector interface 124 having a connector core pattern with mirror-image symmetry about an interface axis of symmetry 126. The term "mirror-image symmetry" refers to there being intended symmetry of the connector core pattern and/or fiber end face core pattern about an axis of symmetry of the connector interface and/or fiber end face that: a) is in a plane orthogonal to a longitudinal axis of the connector and/or optical fiber, and b) bisects the connector interface and/or fiber end face. The connector 120 in the depicted embodiment includes a key axis 128 that is colinear with the axis of symmetry 126, and each end face 38 includes four cores 14, 30 in a 2×2 configuration. The end faces 38 are arranged in the connector 120 so that one half of the end faces 38 (e.g., six end faces 38) have one draw direction and the other half of the end faces 38 have a draw direction opposite that of the one half.

Figure 15:
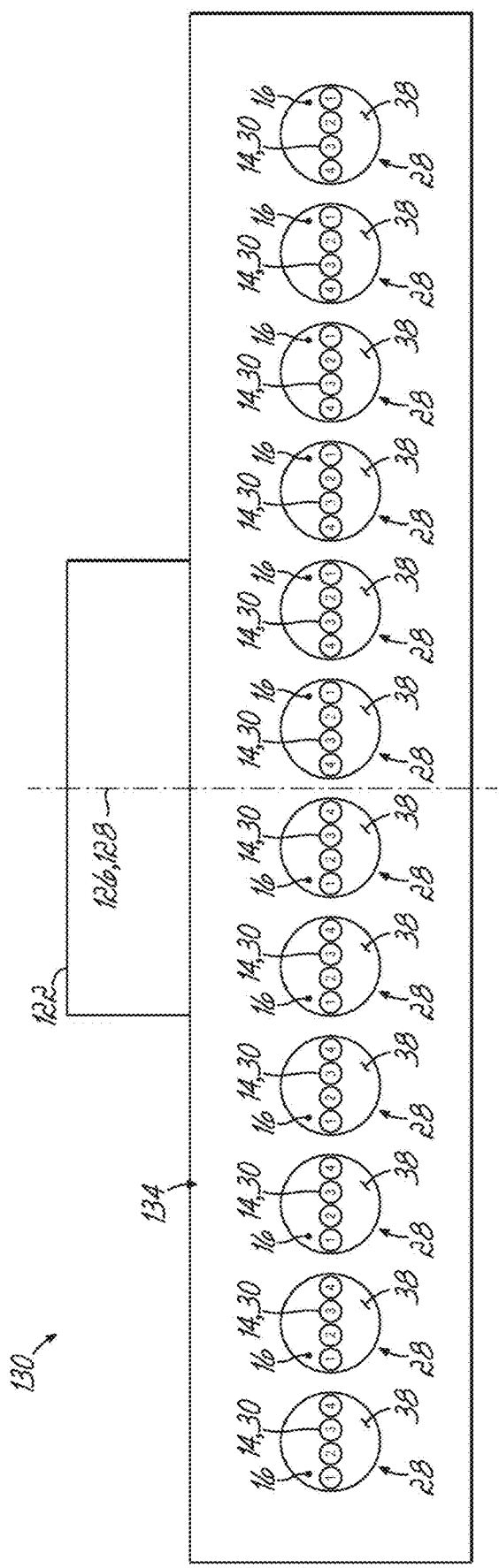
FIG. 15 is a schematic end view of an exemplary connector that may be operatively coupled to the other end of the multicore fiber optic cable of FIG. 14.

FIG. 15 depicts an exemplary connector 130 which may be operatively coupled to the other end of the exemplary multicore fiber optic cable of FIG. 14. As described above with respect to FIG. 14, each core configuration transformer 28 includes an end face 38 having a plurality of cores 14, 30. The connector 130 includes the alignment key 122, and the end faces 38 of the core configuration transformers 28 are arranged within the cable connector 130 to define a connector interface 134 having a connector core pattern with mirror-image symmetry about the interface axis of symmetry 126. In contrast to the connector 120 of FIG. 14, each end face 38 of connector interface 132 includes four cores/waveguides in a 1×4 configuration. In a similar manner as described above with regard to connector 120, the plurality of end faces in the connector 130 are arranged so that one half (e.g., six end faces 38) have one draw direction and the other half the opposite draw direction.

Figure 16:
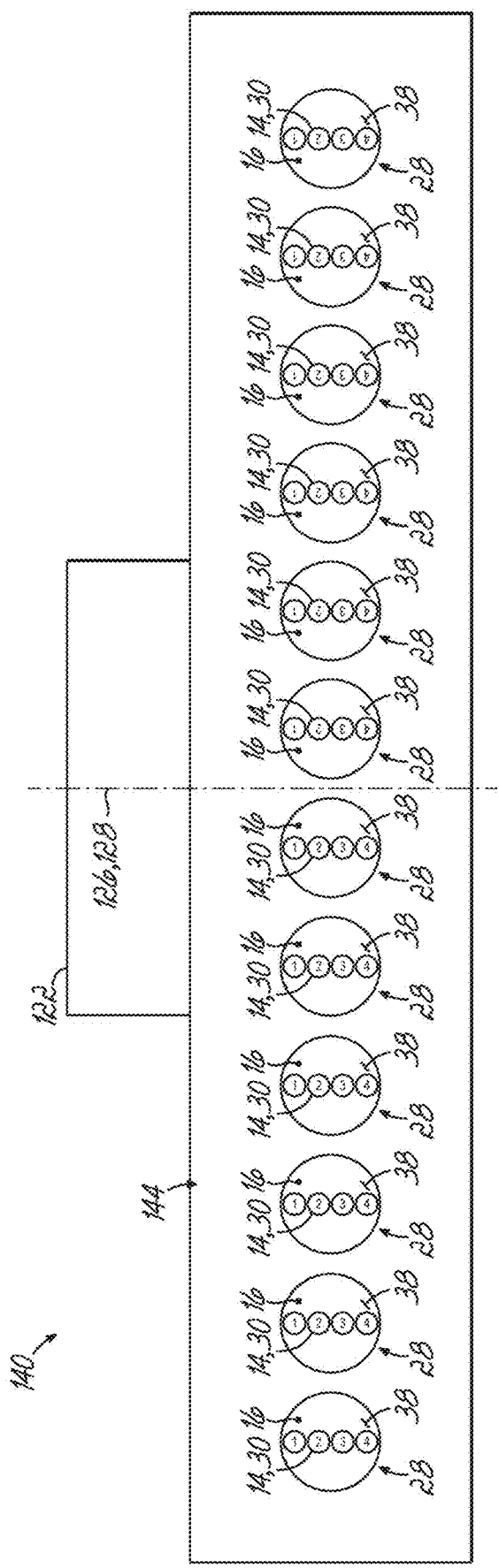
FIG. 16 is a schematic end view of an alternative exemplary connector that may be operatively coupled to the other end of the multicore fiber optic cable of FIG. 14.

FIG. 16 depicts another exemplary connector 140 which may be operatively coupled to the other end of the exemplary multicore fiber optic cable of FIG. 14. In this embodiment, the end faces 38 of the core configuration transformers 28 are also arranged within the cable connector 130 to define a connector interface 134 having a connector core pattern with mirror-image symmetry about the interface axis of symmetry 126. As with connector 130 of FIG. 15, each end face 38 of connector interface 142 includes four cores/waveguides in a 1×4 configuration. However, the orientation of each end face 38 has been rotated 90 degrees so that the one dimensional array is parallel to the key axis 128 rather than orthogonal to the key axis 128.

The plurality of end faces in connector 140 are also arranged so that one half (e.g., six end faces 38) has one draw direction and the other half has the opposite draw direction. The resulting mirror-image symmetry of the connector core patterns of connector interfaces 124, 136, 146 may be advantageous for structured multicore optical fiber cable systems. However, it should be understood that the end faces 38 may be oriented independently in each connector 120, 130, 140, and that the multicore optical fibers in the ferrules of connectors 120, 130, 140 may have different core patterns with respect to fiber draw direction.

Figure 17:
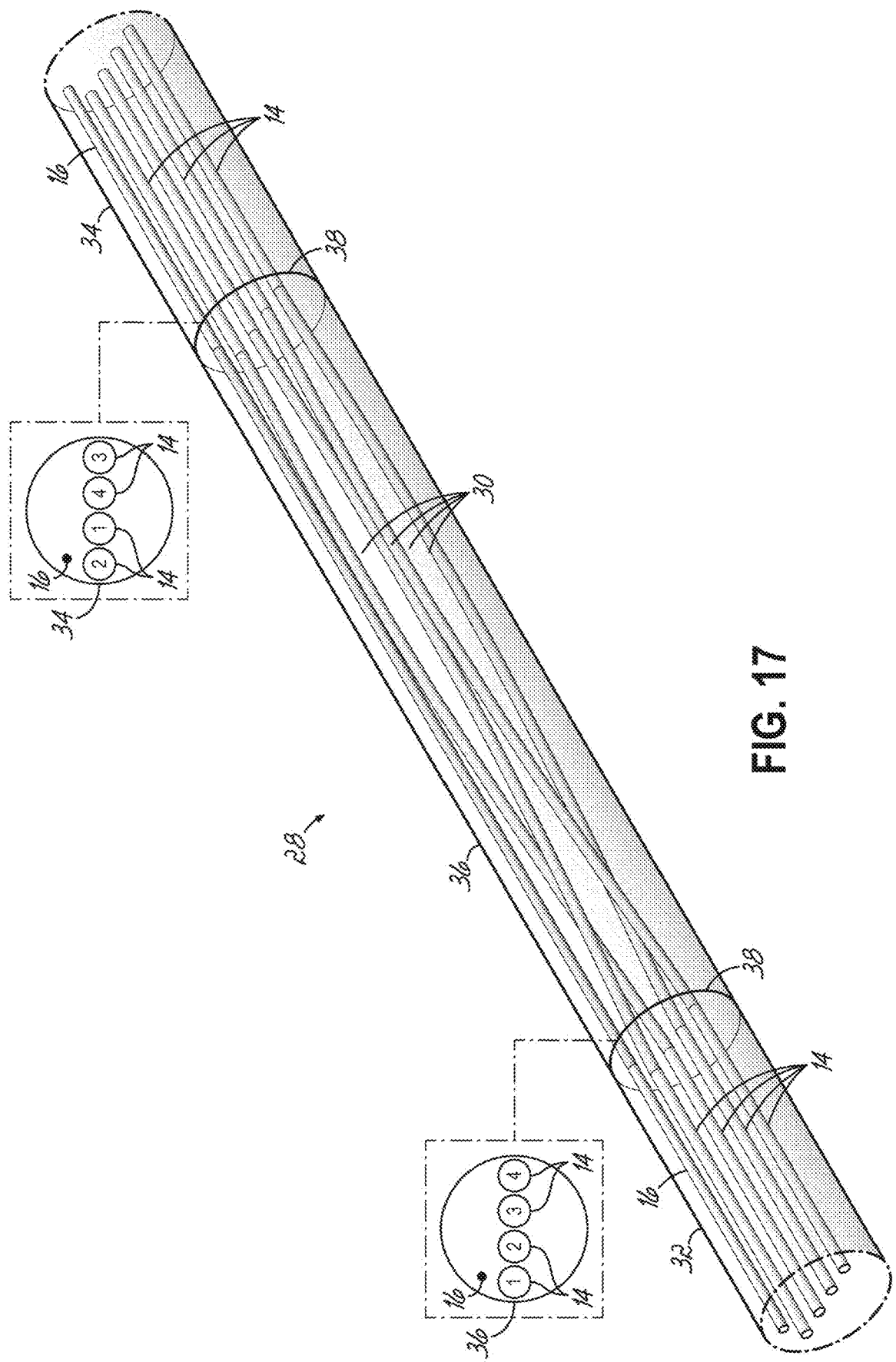
FIG. 17 is a diagrammatic perspective view of a core configuration transformer including a plurality of routing cores that maintains core location and transforms core polarity.

One advantage provided by the core configuration transformers disclosed herein is the flexibility of using prefabricated transforming multicore optical fibers to configure connectors into different fiber and core polarities. In contrast, using devices fabricated in waveguide substrates does not allow this flexibility. By way of example, FIG. 17 illustrates an exemplary 1×4 core configuration transformer 28 that swaps the inner and outer cores between two 1×4 multicore optical fibers 32, 34. This results in the core patterns at opposite ends of the transforming optical fiber 36 having cores in the same locations, but with different core polarities. The routing cores 30 may be configured to have the same length without crossing in order to preserve time alignment between signals. One way lengths may be kept the same is by rotating the cores having their polarity swapped about a common axis along the length of the transforming optical fiber so as to form a pair of double helixes. This type of core configuration transformer 28 could be used in pairs, for example, to balance crosstalk and losses between cores in a link using a one-dimensional core array while maintaining transceiver core polarities. The devices may be positioned in the link such that each transceiver path has a balanced path length through the outer and inner cores, thereby enabling a flat insertion loss across the transceiver channels. This feature could also minimize skew among the channels.

Transforming optical fibers 36 may be embedded in places other than a connector. For example, the transforming optical fiber 36 may be fusion spliced to other multicore optical fibers, and these fusion splices embedded inside a furcation housing. The multicore transforming optical fiber may also be packaged into a connector adaptor. Aspects of the disclosure may be applied, but are not limited, to duplex LC connectors (e.g., according to IEC 61754-20: 2012) and very-small form factor (VSFF) dual-ferrule connectors such as CS, SN, or MDC-type connectors (e.g., each according to the Quad Small Form Factor Pluggable Double Density Multi Source Agreement hardware specification revision 6.3 and the documents referred to therein). VSFF dual-ferrule connectors include two single-fiber ferrules within a common housing.

Another class of very small form factor array connectors include the MMC connector available from US Conec of Hickory NC, United States, and the SN-MT connector available from Senko of Boston MA, United States. VSFF connectors may increase front panel density by about three times as compared to standard MPO connectors. A VSFF connector typically includes an alignment key located on the narrow side of the connector body to enable easy stacking of multiple VSFF connectors. This feature may impact multicore fiber optic trunk cable design in methods not covered by the TIA-568 standard. By way of comparison with standard MPO connectors (which may be considered as "row connectors") the MMC/SN-MT connectors may be considered as "column connectors". For angled single mode connectors, the mating connectors may have the alignment keys aligned in the same orientation.

It should be understood that core configuration transformers are not limited to the exemplary embodiments depicted herein. Persons having ordinary skill in the art will appreciate that core configuration transformers may be used to bridge between multicore optical fibers with different core configurations than just those depicted. This includes multicore optical fibers having different core pitches, core patterns, symmetries, and mode field diameters. Core configuration transformers are also not limited to any particular number of cores or optical fibers having any particular diameter. Moreover, these all fiber devices can be used to route transmission signals through different cores of the multicore optical fiber in a link.

Accordingly, while the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments.

Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A method of making a core configuration transformer, comprising:
   splicing a first end of a length of coreless optical fiber to a first end face of a first multicore optical fiber including a first plurality of cores that define a first end face core pattern at the first end face;
   splicing a second end of the length of coreless optical fiber to a second end face of a second multicore optical fiber including a second plurality of cores that define a second end face core pattern at the second end face different from the first end face core pattern; and
   defining a transforming optical fiber by writing a plurality of routing cores in the length of coreless optical fiber each configured to operatively couple a respective core of the first plurality of cores to a respective core of the second plurality of cores.

2. The method of claim 1, further comprising:
   cleaving at least a portion of one of the first multicore optical fiber or the second multicore optical fiber to expose a third end face; and
   operatively coupling the third end face to a first connector.

3. The method of claim 2, wherein the first connector includes a ferrule, and operatively coupling the third end face comprises:
   placing the transforming optical fiber into the ferrule of the first connector.

4. The method of claim 2, wherein the other of the first multicore optical fiber or the second multicore optical fiber includes a fourth end face, and further comprising:
   operatively coupling the fourth end face to a second connector.

5. The method of claim 1, wherein writing the plurality of routing cores comprises, for each routing core:
   positioning a focal point of a laser beam within the length of coreless optical fiber proximate to a selected core of the first plurality of cores;
   causing the laser beam to provide energy sufficient to induce a change in a refractive index of the length of coreless optical fiber in a region of the focal point;
   moving at least one of the focal point or the length of coreless optical fiber so that the focal point is moved along a predetermined path within the length of coreless optical fiber connecting the selected core of the first plurality of cores to a selected core of the second plurality of cores; and
   continuing to cause or repeatedly causing the laser beam to provide the energy and moving the focal point along the predetermined path until the routing core operatively couples the selected core of the first plurality of cores to the selected core of the second plurality of cores.

6. The method of claim 1, wherein the splicing of the length of coreless optical fiber to the first multicore optical fiber and to the second multicore optical fiber is by fusion splicing.

7. The method of claim 1, wherein the cores of one of the first end face core pattern and the second end face core pattern are arranged in a one-dimensional array, and the cores of the other of the first end face core pattern and the second end face core pattern are arranged in a two-dimensional array.

8. The method of claim 1, wherein locations of the plurality of routing cores in the first end face core pattern are the same as the locations of the plurality of routing cores in the second end face core pattern, and a polarity of at least one core in the first end face core pattern is different than the polarity of the at least one core in the second end face core pattern.

9. The method of claim 8, wherein:
   each of the first end face core pattern and the second end face core pattern is arranged in a one-dimensional array, and
   polarities of at least one inner core and one outer core in the first end face core pattern are swapped as compared to the polarities of the at least one inner core and one outer core in the second end face core pattern.

10. The method of claim 1, wherein each of the routing cores is the same length.

* * * * *